United States Patent Office 3,356,168
Patented Dec. 5, 1967

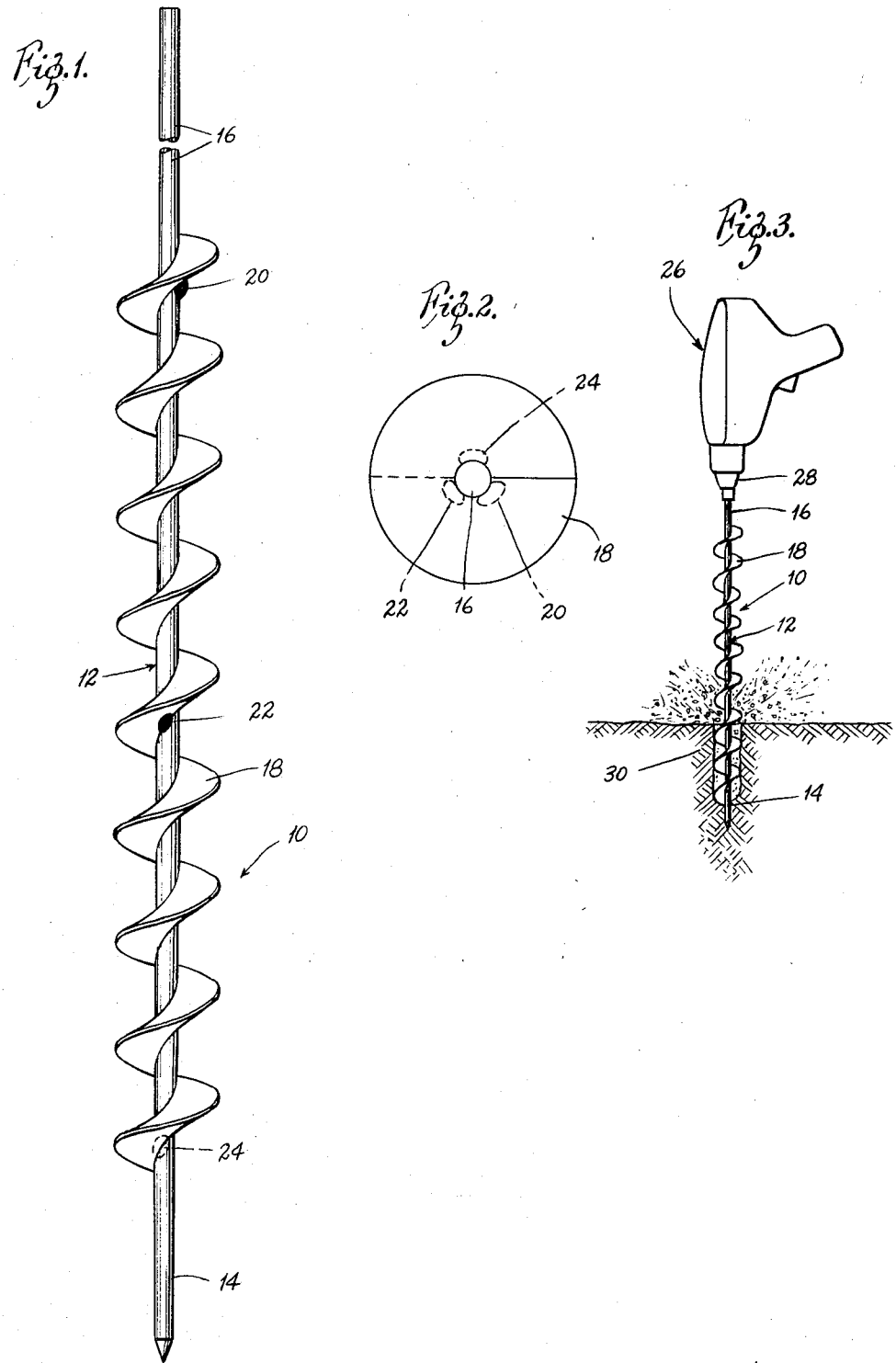

3,356,168
GARDEN AND LAWN AUGER
William H. Johnson, 1941 Karlin Drive,
St. Louis, Mo. 63131
Filed Apr. 1, 1965, Ser. No. 444,565
2 Claims. (Cl. 175—394)

ABSTRACT OF THE DISCLOSURE

A small lawn tool for boring holes in the ground for watering and feeding trees, shrubs, lawns, and the like, comprising a small diameter shaft of some eighteen inches pointed at the lower end, and a segment of flighting secured to the central portion of the shaft by spot welding spaced along and balanced around said shaft to minimize rotational imbalance. The upper end of the shaft is engageable by a hand drill for powered rotation.

---

The present invention relates generally to lawn and garden tools, and more particularly to a novel auger for rapidly boring holes in lawns and gardens for water, air, fertilizers, and the like.

It is helpful to lawns, shrubs, trees, and the like, to provide water, air, fertilizer, and the like, twelve to eighteen inches below the ground. In dry weather, it is not easy to provide holes of such depth and suitable diameter in sufficient numbers and without damaging the area with any inexpensive, lightweight tools known to the applicant. There has long existed the need for a device to accomplish the desired result.

Therefore, an object of the present invention is to provide a lawn and garden tool which fulfills the above existing need.

In brief, the present novel tool includes in a preferred embodiment a substantial shaft some eighteen inches in length over-all in a preferred embodiment to which is secured, as by balanced welding, a segment of continuous flighting some one and one-half inches in over-all width. At one end of the shaft is a point for easing and leading the tool into the ground, and at the other end is a portion for receiving a drill or other power means.

Hence, another object is to provide a sturdy lawn and garden tool constructed for efficient and speedy boring of holes for water, fertilizers, air, and the like.

Other objects are to provide a lawn and garden tool which is easily employed with a powered drill, which is sturdy and long lasting, which raises and scatters the dirt from a hole, which is fast in operation, and which otherwise fulfills the objects and advantages sought therefor.

The foregoing and other objects and advantages are apparent from the following description taken with the accompanying drawing, in which:

FIGURE 1 is a side elevational view of a lawn and garden tool incorporating the teachings of the present invention;

FIGURE 2 is an enlarged diagrammatic plan view thereof, illustrating the one hundred and twenty degree spacing of the welds; and FIGURE 3 is a diagrammatic side elevational view illustrating use of the tool with a power drill.

Referring to the drawings more particularly by reference numerals, 10 indicates generally a lawn and garden tool incorporating the principles of the present invention. The tool 10 includes a shaft 12 having a point portion 14, which by way of illustration may be two inches long for an eighteen inch tool, and a drill-receiving portion 16, which may be four inches. Continuous flighting 18 is secured to the shaft 12 by spot welding 20, 22 and 24 spaced along the shaft 12 and at one hundred and twenty degrees to minimize unbalance. The flighting 18 is of uniform thickness, of substantial width and of relatively low gradient, running three hundred and sixty degrees per one and a half inches of shaft 12. The flighting 18 above the first revolution functions as a conveyor to raise to the surface the dirt severed by the lowest or first revolution.

The tool 10 is generally driven by a one-quarter inch or larger drill 26, as shown in FIGURE 3, in which the tool 10 is retained by the usual chuck 28.

In operation, after securing the tool 10 in the chuck 28 by the portion 16, the point portion 14 is pushed vertically downward into the ground 30. The drill 26 is energized as the flighting 18 touches the ground, and light pressure is sufficient to quickly drill a hole to some sixteen to eighteen inches. An average drilling time per hole is only several seconds. The dirt is lifted by the flighting 18 and scattered as indicated in FIGURE 3. Vibration is reduced to a minimum by the welding arrangement. The tool 10 may be quickly withdrawn from each hole.

Manifestly, the foregoing may be repeated from spot to spot, thereby providing many holes in short order.

It is apparent that there has been provided a lawn and garden tool which fulfills the objects and advantages sought therefor.

It is to be understood that the foregoing description and the accompanying drawings have been given by way of illustration and example. It is also to be understood that changes in form of the several parts, substitution of equivalent elements and rearrangement of parts, which will be readily apparent to one skilled in the art, are contemplated as within the scope of the present invention, which is limited only by the claims which follow.

What is claimed is:

1. In combination, a portable lawn and garden earth drilling tool adapted for actuation by a small diameter hand drill and the like comprising a shaft, and flighting extending along said shaft continuously along a major extent thereof constructed for boring and conveying dirt to the surface said flighting being secured to said shaft by spot welding spaced along and balanced around said shaft to minimize rotational imbalance.

2. The combination of claim 1 in which said spot welding secured said flighting to said shaft is spaced along and at one hundred and twenty degrees around said shaft to minimize rotational unbalance.

References Cited

UNITED STATES PATENTS

| 1,362,775 | 12/1920 | Bunker | 175—310 |
| 1,856,065 | 5/1932 | Austin | 175—394 X |
| 2,221,680 | 11/1940 | Parrish | 175—394 |
| 2,779,259 | 12/1957 | Kelsey | 175—385 X |
| 2,890,860 | 6/1959 | Smith | 175—394 X |
| 2,969,844 | 12/1961 | Hamrick | 175—62 X |

FOREIGN PATENTS

| 956,717 | 4/1964 | Great Britain. |
| 302,446 | 1/1955 | Switzerland. |

CHARLES E. O'CONNELL, *Primary Examiner.*

R. E. FAVREAU, *Assistant Examiner.*